US010704469B2

(12) United States Patent
Dam et al.

(10) Patent No.: US 10,704,469 B2
(45) Date of Patent: **\*Jul. 7, 2020**

(54) AUXILIARY TORCH INGNITION

(71) Applicant: Woodward, Inc., Fort Collins, CO (US)

(72) Inventors: Bidhan Dam, Zeeland, MI (US); Jimroy McCormack, Zeeland, MI (US); Fei Philip Lee, Holland, MI (US); Conor Riordan, Zeeland, MI (US); Logan Oonk, Zeeland, MI (US); Erik Pederson, Zeeland, MI (US); Michael Stratton, Zeeland, MI (US)

(73) Assignee: Woodward, Inc., Fort Collins, CO (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/643,736

(22) Filed: Jul. 7, 2017

(65) Prior Publication Data
US 2019/0010872 A1    Jan. 10, 2019

(51) Int. Cl.
*F02C 7/264*    (2006.01)
*F02C 7/266*    (2006.01)
(Continued)

(52) U.S. Cl.
CPC ............ *F02C 7/266* (2013.01); *F02C 7/18* (2013.01); *F02C 7/222* (2013.01); *F02C 7/264* (2013.01);
(Continued)

(58) Field of Classification Search
CPC ...... F02C 7/264; F02C 7/266; F05D 2260/99; F23R 3/045; F23R 3/32; F23R 2900/00009; F23D 11/402
See application file for complete search history.

(56) References Cited

U.S. PATENT DOCUMENTS 2,760,340 A * 8/1956 Seglem .................. F02C 7/266
33/23.02
2,967,224 A * 1/1961 Irwin ...................... F02C 7/264
361/266
(Continued)

FOREIGN PATENT DOCUMENTS

DE    1096684        1/1961
DE    2839280 A1 *   3/1980 .............. F23C 9/006
(Continued)

OTHER PUBLICATIONS

International Search Report and Written Opinion in International Application No. PCT/US2018/040003, dated Oct. 5, 2018, 16 pages.
(Continued)

*Primary Examiner* — Gerald L Sung
*Assistant Examiner* — Marc J Amar
(74) *Attorney, Agent, or Firm* — Fish & Richardson P.C.

(57) ABSTRACT

A torch igniter includes an auxiliary fuel injector; an ignition source; and an igniter body carrying the auxiliary fuel injector and the ignition source. The igniter body includes an auxiliary combustion chamber having a side wall extending axially from a first end wall to a second end wall, the side wall defining an interior cavity between the first and second end walls. The igniter body further includes a premixing cup residing within the interior cavity including a cylindrical wall radially surrounding the auxiliary fuel injector and an auxiliary air inlet, the cylindrical wall of the premixing cup protruding axially outward relative to the first end wall of the auxiliary combustion chamber through a portion of the interior cavity to delineate a premixing zone radially inward of the cylindrical wall and a recirculation zone radially outward of the cylindrical wall.

19 Claims, 4 Drawing Sheets

(51) Int. Cl.
  *F23R 3/34* (2006.01)
  *F23R 3/28* (2006.01)
  *F02C 7/22* (2006.01)
  *F02C 7/18* (2006.01)
  *F23R 3/14* (2006.01)
  *F23R 3/32* (2006.01)
  *F23R 3/04* (2006.01)

(52) U.S. Cl.
  CPC ............ *F23R 3/045* (2013.01); *F23R 3/14* (2013.01); *F23R 3/286* (2013.01); *F23R 3/32* (2013.01); *F23R 3/34* (2013.01); *F23R 3/343* (2013.01); *F05D 2260/202* (2013.01); *F05D 2260/99* (2013.01); *F23C 2202/10* (2013.01); *F23C 2700/026* (2013.01); *F23C 2900/03005* (2013.01); *F23D 2207/00* (2013.01); *F23R 2900/03042* (2013.01)

(56) References Cited

U.S. PATENT DOCUMENTS

| | | | |
|---|---|---|---|
| 3,297,914 A | | 1/1967 | Saintsbury |
| 3,954,389 A | * | 5/1976 | Szetela ............... F02C 7/264 431/353 |
| 4,141,213 A | | 2/1979 | Ross |
| 4,215,979 A | | 8/1980 | Morishita |
| 4,301,656 A | | 11/1981 | Stettler |
| 4,604,104 A | * | 8/1986 | Adis ............... F23D 11/402 48/107 |
| 4,860,533 A | | 8/1989 | Joshi |
| 5,085,040 A | | 2/1992 | Tilston |
| 5,590,517 A | | 1/1997 | DeFreitas |
| 6,912,857 B2 | | 7/2005 | Schmotolocha et al. |
| 7,299,620 B2 | | 11/2007 | Stuttaford et al. |
| 8,161,725 B2 | | 4/2012 | Yu |
| 8,726,631 B2 | | 5/2014 | Rudrapatna et al. |
| 9,080,772 B2 | | 7/2015 | Prociw et al. |
| 9,212,823 B2 | * | 12/2015 | Boardman ............. F23R 3/286 |
| 2012/0111014 A1 | * | 5/2012 | Beran ................... F23R 3/002 60/758 |
| 2014/0013761 A1 | * | 1/2014 | Pasqualotto ........... F23R 3/286 60/737 |
| 2014/0144142 A1 | | 5/2014 | Abd El-Nabi et al. |
| 2014/0366551 A1 | * | 12/2014 | Prociw ................... F23R 3/14 60/776 |
| 2016/0047318 A1 | * | 2/2016 | Dam ...................... F02C 7/264 60/776 |
| 2016/0102860 A1 | * | 4/2016 | Chandler ............... F23R 3/002 60/754 |
| 2016/1002860 | | 4/2016 | Chandler et al. |

FOREIGN PATENT DOCUMENTS

| | | | |
|---|---|---|---|
| EP | 0120174 A1 | * 10/1984 | ............... F23R 3/28 |
| EP | 2884174 | 6/2015 | |
| GB | 618688 | 2/1949 | |
| GB | 618688 A | * 2/1949 | ............. F02C 7/236 |
| GB | 799898 A | * 8/1958 | ............. F02C 7/266 |

OTHER PUBLICATIONS

International Search Report and Written Opinion in International Application No. PCT/US2018/039971, dated Oct. 5, 2018, 15 pages.

* cited by examiner

FIG. 4

# AUXILIARY TORCH INGNITION

TECHNICAL FIELD

This specification generally relates to combustor assemblies for gas turbine engines that incorporate auxiliary torch ignition systems to facilitate ignition in a main combustion chamber.

BACKGROUND

The gas turbine engine is the preferred class of internal combustion engine for many high power applications. Fundamentally, the gas turbine engine features an upstream rotating compressor coupled to, and typically driven by, a downstream turbine, with a combustion chamber residing in-between the two rotary components. A torch igniter is a device that may be used to ignite the primary combustor of a gas turbine engine. In some applications, the torch igniter has advantages over conventional spark igniters, because it can provide larger amounts of energy release to the main combustor, and thus, is capable of lighting the engine in a more reliable manner. To achieve this, the torch igniter requires an auxiliary source of fuel and air, as well as an ignition source. Auxiliary air flow is typically obtained from the plenum downstream of the engine's compressor or from an external source of compressed air; and the auxiliary fuel is obtained from the fuel-metering unit or manifold or from an independent fuel source. Air flow requirements to operate the torch igniter may vary under different conditions, but are often significantly less than the air flow requirements of the primary combustor. On a typical engine, much like a conventional spark igniter, there can be two or more torch igniters for redundancy.

SUMMARY

In one aspect, a gas turbine combustor assembly includes: a primary combustion chamber in fluid communication with a primary fuel injector and a primary air inlet; and a torch ignitor coupled to the primary combustion chamber. The torch igniter includes: an auxiliary fuel injector; an ignition source; and an igniter body carrying the auxiliary fuel injector and the ignition source. The igniter body includes an auxiliary combustion chamber having a side wall extending axially from a first end wall to a second end wall, the side wall defining an interior cavity between the first and second end walls. The igniter body further includes a premixing cup residing within the interior cavity including a cylindrical wall radially surrounding the auxiliary fuel injector and an auxiliary air inlet, the cylindrical wall of the premixing cup protruding axially outward relative to the first end wall of the auxiliary combustion chamber through a portion of the interior cavity to delineate a premixing zone radially inward of the cylindrical wall and a recirculation zone radially outward of the cylindrical wall, with the ignition source residing on the side wall of the auxiliary combustion chamber at a position proximate the recirculation zone.

In some examples, the torch igniter further includes an auxiliary fuel source in fluid communication with a nozzle orifice of the auxiliary fuel injector, the auxiliary fuel source configured to provide a pressurized flow of fuel for injection into the auxiliary combustion chamber by the auxiliary fuel injector; and a bypass line configured to return at least a portion of the pressurized flow of fuel to a main engine fuel manifold.

In some examples, the auxiliary combustion chamber is substantially cylindrical in shape, with the side wall having a circular cross-section of constant diameter, and the first and second end walls being substantially planar.

In some examples, the second end wall defines a fluid outlet leading to an outlet tube in fluid communication with the primary combustion chamber. In some examples, the igniter body further includes an outer shell surrounding at least a portion of the auxiliary combustion chamber, the outer shell including a fluid inlet coaxially aligned with the outlet tube. In some examples, the igniter body includes a fluid annulus formed between an inner surface of the shell and an outer surface of the auxiliary combustion chamber, the annulus directing fluid from the fluid inlet across the outer surface of the auxiliary combustion chamber towards the first end wall.

In some examples, the second end wall of the auxiliary combustion chamber defines a fluid outlet leading to an outlet tube in fluid communication with the primary combustion chamber. In some examples, at least a portion of the outlet tube includes a distributed pattern of dilution apertures, with each of the dilution apertures configured to direct fluid in cross-flow with heated gas exiting the auxiliary combustion chamber through the outlet tube.

In some examples, the igniter body further includes a fluid swirler residing at an entrance to the premixing cup. In some examples, the fluid swirler includes an axial fluid swirler including a circumferential pattern of swirl opening surrounding an outlet of the auxiliary fuel injector.

In some examples, the torch igniter further includes a shielding device configured to at least partially shield the ignition source from fluid flow through the auxiliary combustion chamber. In some examples, the shielding device is coupled to an inner surface of the auxiliary combustion chamber proximate the ignition source, and includes a curved, convex surface projecting towards the premixing cup.

In some examples, at least a portion of the side wall of the auxiliary combustion chamber includes a distributed pattern of cooling apertures, with each of the cooling apertures obliquely canted relative to an inner surface of the side wall so as to cause fluid entering an interior cavity of the auxiliary combustion chamber through the cooling apertures to form a fluid film along the inner surface.

In another aspect, a method of operating a gas turbine combustor assembly includes the steps of: receiving auxiliary flows of fuel and air in a premixing cup of an igniter body of the gas turbine combustor assembly; at least partially mixing the auxiliary fuel and air flows in a premixing zone of the premixing cup, and discharging the auxiliary fuel/air mixture into an auxiliary combustion chamber of the igniter body; directing the discharged auxiliary fuel/air mixture into a primary recirculation zone including an annular space between the premixing cup and an inner surface of the auxiliary combustion chamber; igniting the auxiliary fuel/air mixture at a location proximate the primary recirculation zone to form an auxiliary flow of heated fluid; and igniting a primary air/fuel mixture in a primary combustion chamber of the gas turbine combustor assembly with the auxiliary flow of heated fluid from the auxiliary combustion chamber of the igniter body.

In some examples, receiving the auxiliary flow of fuel includes the steps of: directing a pressurized flow of fuel from an auxiliary fuel source to a nozzle orifice of an auxiliary fuel injector in fluid communication with the premixing cup, bypassing the nozzle orifice with at least a portion of the fuel flow, and directing the bypassed portion of the fuel flow to a main engine fuel manifold.

In some examples, receiving the auxiliary flow of air includes directing the air through a fluid inlet. In some examples, the method further includes directing the auxiliary flow of heated fluid through a fluid outlet tube coaxially aligned with the fluid inlet as the auxiliary flow of air is directed through the fluid inlet.

In some examples, the method further includes diluting the auxiliary flow of heated fluid by directing a portion of the auxiliary flow of air in cross-flow with the auxiliary flow of heated flow through a pattern of dilution apertures of the outlet tube.

In some examples, the method further includes cooling a portion of the auxiliary combustion chamber by forming a cooling fluid film along an inner surface of the auxiliary combustion chamber. In some examples, forming the cooling fluid film includes directing a portion of the auxiliary flow of air through a distributed pattern of obliquely canted cooling apertures of the auxiliary combustion chamber In some examples, at least partially mixing the auxiliary fuel and air flows includes inducing a swirling flow pattern in each of the flows In some examples, igniting the auxiliary fuel/air mixture includes energizing an ignition source while at least partially shielding the ignition source from the auxiliary fuel/air mixture.

In yet another aspect, a gas turbine combustor assembly includes: a primary combustion chamber in fluid communication with a primary fuel injector and a primary air inlet; and a torch ignitor coupled to the primary combustion chamber. The torch igniter includes: an auxiliary fuel injector; an ignition source; and an igniter body carrying the auxiliary fuel injector and the ignition source. The igniter body includes an auxiliary combustion chamber having a side wall extending axially from a first end wall to a second end wall, at least a portion of the side wall including a distributed pattern of cooling apertures, with each of the cooling apertures extending obliquely from an outer surface of the side wall to an inner surface of the side wall, so as to cause fluid entering an interior cavity of the auxiliary combustion chamber through the cooling apertures to form a fluid film along the inner surface.

In some examples, the combustor assembly further includes a premixing cup residing within the interior cavity of the auxiliary combustion chamber. In some examples, the premixing cup includes a cylindrical wall radially surrounding the auxiliary fuel injector and an auxiliary air inlet, the cylindrical wall of the premixing cup protruding axially outward relative to the first end wall of the auxiliary combustion chamber through a portion of the interior cavity to delineate a premixing zone radially inward of the cylindrical wall and a recirculation zone radially outward of the cylindrical wall, with the ignition source residing on the side wall of the auxiliary combustion chamber at a position proximate the recirculation zone In some examples, the auxiliary combustion chamber is substantially cylindrical in shape, with the side wall having a circular cross-section of constant diameter, and the first and second end walls being substantially planar.

In some examples, the second end wall defines a fluid outlet leading to an outlet tube in fluid communication with the primary combustion chamber. In some examples, the igniter body further includes an outer shell surrounding at least a portion of the auxiliary combustion chamber, the outer shell including a fluid inlet coaxially aligned with the outlet tube. In some examples, the igniter body includes a fluid annulus formed between an inner surface of the shell and an outer surface of the auxiliary combustion chamber, the annulus directing fluid from the fluid inlet across the outer surface of the auxiliary combustion chamber towards the first end wall.

In some examples, the second end wall of the auxiliary combustion chamber defines a fluid outlet leading to an outlet tube in fluid communication with the primary combustion chamber, at least a portion of the outlet tube including a distributed pattern of dilution apertures, with each of the dilution apertures configured to direct fluid in cross-flow with heated gas exiting the auxiliary combustion chamber through the outlet tube.

In some examples, the igniter body further includes a fluid swirler residing at an entrance to a premixing cup residing within the auxiliary combustion chamber. In some examples, the fluid swirler includes an axial fluid swirler including a circumferential pattern of swirl opening surrounding an outlet of the auxiliary fuel injector.

In some examples, the torch igniter further includes a shielding device configured to at least partially shield the ignition source from fluid flow through the auxiliary combustion chamber. In some examples, the shielding device is coupled to an inner surface of the auxiliary combustion chamber proximate the ignition source, and includes a curved, convex surface.

In still yet another aspect, a gas turbine combustor assembly includes: a primary combustion chamber in fluid communication with a primary fuel injector and a primary air inlet; and a torch ignitor coupled to the primary combustion chamber. The torch igniter includes: an auxiliary fuel injector; an ignition source; and an igniter body carrying the auxiliary fuel injector and the ignition source. The igniter body includes an auxiliary combustion chamber having a side wall extending axially from a first end wall to a second end wall, the second end wall defining a fluid outlet leading to an outlet tube in fluid communication with the primary combustion chamber, at least a portion of the outlet tube including a distributed pattern of dilution apertures, with each of the dilution apertures configured to direct fluid in cross-flow with heated gas exiting the auxiliary combustion chamber through the outlet tube.

In some examples, the combustor assembly further includes a premixing cup residing within an interior cavity of the auxiliary combustion chamber. In some examples, the premixing cup includes a cylindrical wall radially surrounding the auxiliary fuel injector and an auxiliary air inlet, the cylindrical wall of the premixing cup protruding axially outward relative to the first end wall of the auxiliary combustion chamber through a portion of the interior cavity to delineate a premixing zone radially inward of the cylindrical wall and a recirculation zone radially outward of the cylindrical wall, with the ignition source residing on the side wall of the auxiliary combustion chamber at a position proximate the recirculation zone.

In some examples, the auxiliary combustion chamber is substantially cylindrical in shape, with the side wall having a circular cross-section of constant diameter, and the first and second end walls being substantially planar.

In some examples, the second end wall defines a fluid outlet leading to an outlet tube in fluid communication with the primary combustion chamber. In some examples, the igniter body further includes an outer shell surrounding at least a portion of the auxiliary combustion chamber, the outer shell including a fluid inlet coaxially aligned with the outlet tube. In some examples, the igniter body includes a fluid annulus formed between an inner surface of the shell and an outer surface of the auxiliary combustion chamber, the annulus directing fluid from the fluid inlet across the outer surface of the auxiliary combustion chamber towards the first end wall.

In some examples, at least a portion of the side wall of the auxiliary combustion chamber includes a distributed pattern of cooling apertures, with each of the cooling apertures obliquely canted relative to an inner surface of the side wall so as to cause fluid entering an interior cavity of the auxiliary combustion chamber through the cooling apertures to form a fluid film along the inner surface.

In some examples, the igniter body further includes a fluid swirler residing at an entrance to a premixing cup residing within the auxiliary combustion chamber. In some examples, the fluid swirler includes an axial fluid swirler including a circumferential pattern of swirl opening surrounding an outlet of the auxiliary fuel injector.

In some examples, the torch igniter further includes a shielding device configured to at least partially shield the ignition source from fluid flow through the auxiliary combustion chamber. In some examples, the shielding device is coupled to an inner surface of the auxiliary combustion chamber proximate the ignition source, and includes a curved, convex surface.

In yet still another aspect, a method of operating a gas turbine combustor assembly includes the steps of: mixing auxiliary fuel and air flows in an auxiliary combustion chamber to form an auxiliary fuel/air mixture; igniting the auxiliary fuel/air mixture to form an auxiliary flow of heated fluid; directing the auxiliary flow of heated fluid through the auxiliary combustion chamber towards a primary combustion chamber; while directing the auxiliary flow of heated fluid, receiving a flow of cooling fluid, and directing the cooling fluid so as to form a film of cooling fluid along an inner surface of the auxiliary combustion chamber and dilute the auxiliary flow of heated fluid; and igniting a primary air/fuel mixture in a primary combustion chamber of the gas turbine combustor assembly with the diluted auxiliary flow of heated fluid from the auxiliary combustion chamber.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

In a gas turbine engine, the torch igniter ignites fuel released by combustor nozzles in a combustor of the engine to produce heated combustion products. The heated combustion products are, in turn, expanded through a turbine of the engine to produce torque. Reliable ignition and flame propagation around the primary combustor nozzles in conditions with relatively low air pressure drop (delta P) may require a heightened minimum level of ignition energy provided to the operating envelope. This concern is often exacerbated when the ambient environment is particularly cold. In order to provide sufficient ignition energy across a broad range of operating conditions in different ambient environments, high-quality flame stability/operability of the torch igniter system is desired.

In certain aspects, the present disclosure relates to torch igniter systems that supply high ignition energy by incorporating various combinations of design features in the igniter body. In some implementations, for example, the igniter body includes an auxiliary combustion chamber with a premixing cup that directs a mixture of fuel and air into a recirculation zone proximate an ignition source. The entrance to the premixing cup may include an air swirler to enhance recirculation and mixing of the auxiliary air and fuel flows in the auxiliary combustion chamber.

In some implementations, optimization of the turbulence and swirling components is achieved to sustain the torch igniter flame without having to keep the ignition source on. In some implementations, a torch igniter in accordance with one or more embodiments of the present disclosure can improve cold day combustor light off performance, and provide reliable re-light capability across a wide range of operating conditions by providing high energy release that is enhanced by swirl stabilized combustion in the torch combustor.

Further, certain torch igniter systems of the present disclosure incorporate design features that extend the operational life of components having high-temperature failure mechanisms. For instance, in some implementations, a side wall of the auxiliary combustion chamber includes a pattern of distributed cooling apertures. As discussed in detail below, the cooling apertures can be configured to enable cooling fluid (e.g., air) to contact the inner surface of the auxiliary combustion chamber without adversely affecting the combustion conditions therein (e.g., fuel/air ratio, air/fuel temperatures, air/fuel flow velocities, etc.). As another example, in some implementations, an outlet tube receiving the combustion products from the auxiliary combustion chamber includes a pattern of dilution apertures. The dilution apertures on the outlet tube can be configured to facilitate mixing of a dilution fluid (e.g., air) with the combustion products to effect a temperature change.

Figure 1:
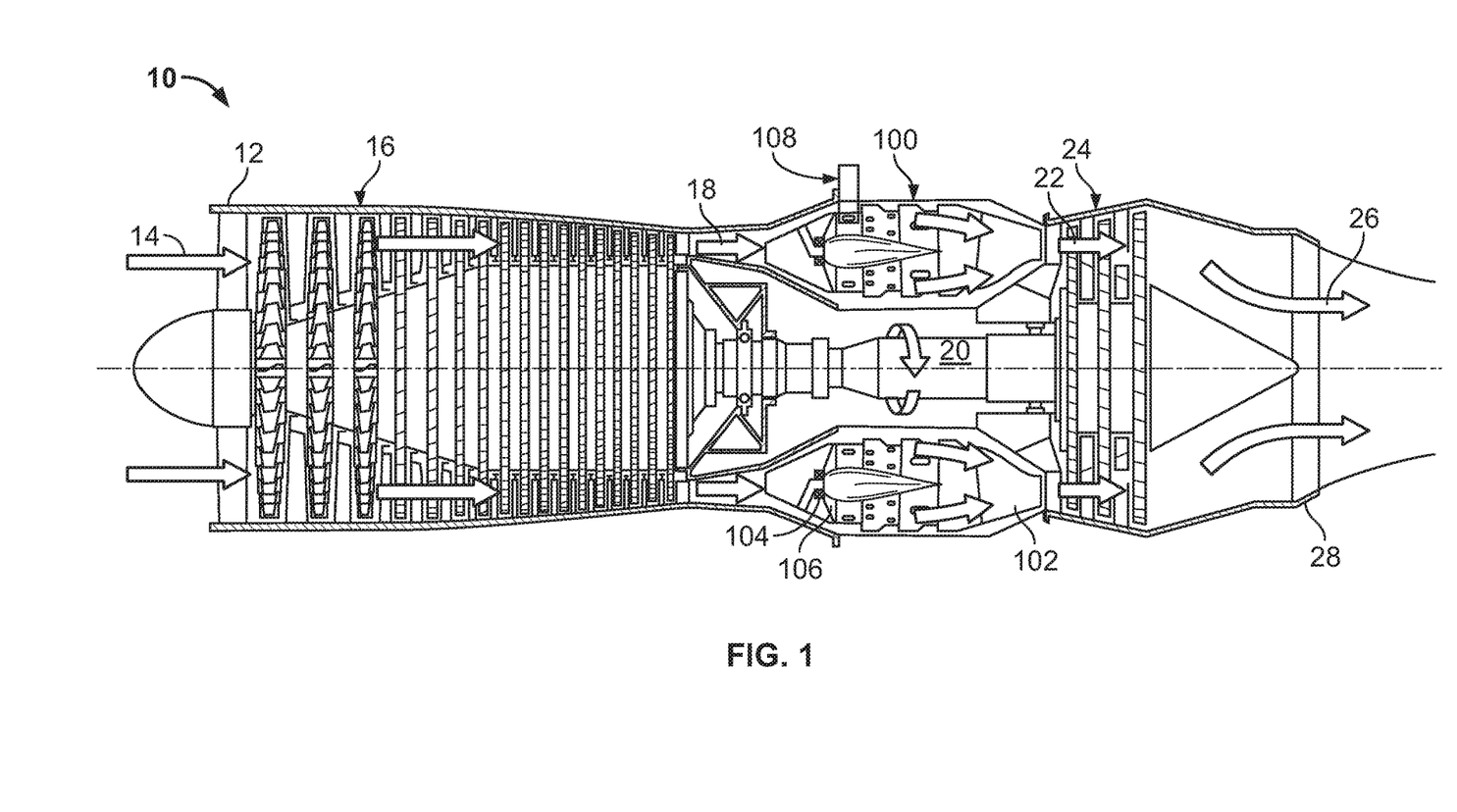
FIG. 1 is a half, side cross-sectional view of an example gas turbine engine.

FIG. 1 is a half, side cross-sectional view of an example gas turbine engine 10. The gas turbine engine 10 is turbojet-type gas turbine that could be used, for example, to power jet aircrafts. However, it is appreciated that the concepts described in the present disclosure are not so limited, and can be incorporated in the design of various other types of gas turbine engines (e.g., turbofan, turboprop, turboshaft, or industrial/marine engines).

As shown, the gas turbine engine 10 generally facilitates a continuous axial flow of gas. That is, gas generally flows through the engine 10 in the axially downstream direction indicated by the arrows in FIG. 1. The gas turbine engine 10 includes an intake 12 that receives ambient air 14 and directs the ambient air to a compressor 16. The ambient air 14 is drawn through multiple stages of the compressor 16. High-pressure air 18 exiting the compressor 16 is introduced to a combustor 100. In certain instances, the combustor 100 is an annular combustor circumscribing the engine's main shaft 20 or a can-type combustor positioned radially outward of the shaft.

The combustor 100 includes a combustion shield 102, multiple fuel injectors 104, a combustor dome 106, and a torch igniter system 108. At the combustor 100, the high-pressure air 18 is mixed with liquid or gaseous fuel (not shown) and ignited by the torch igniter system 108 to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine by the main shaft 20. Exhaust gas 26 leaving the turbine 24 is accelerated into the atmosphere through an exhaust nozzle 28 to provide thrust or propulsion power or energy for electrical power generation.

Figure 2A:
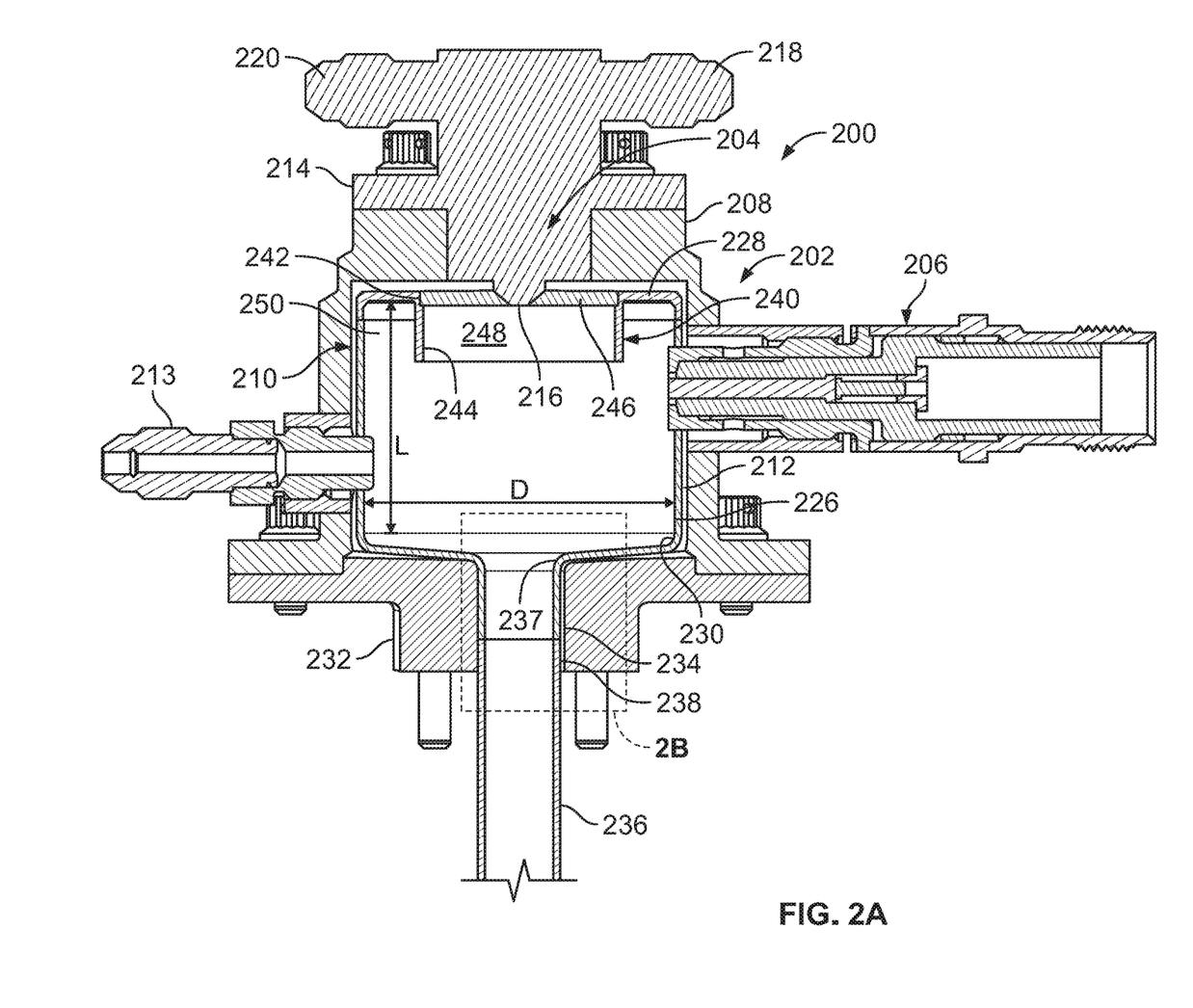
FIG. 2A is a half, side cross-sectional view of a first example torch igniter.
Figure 2B:
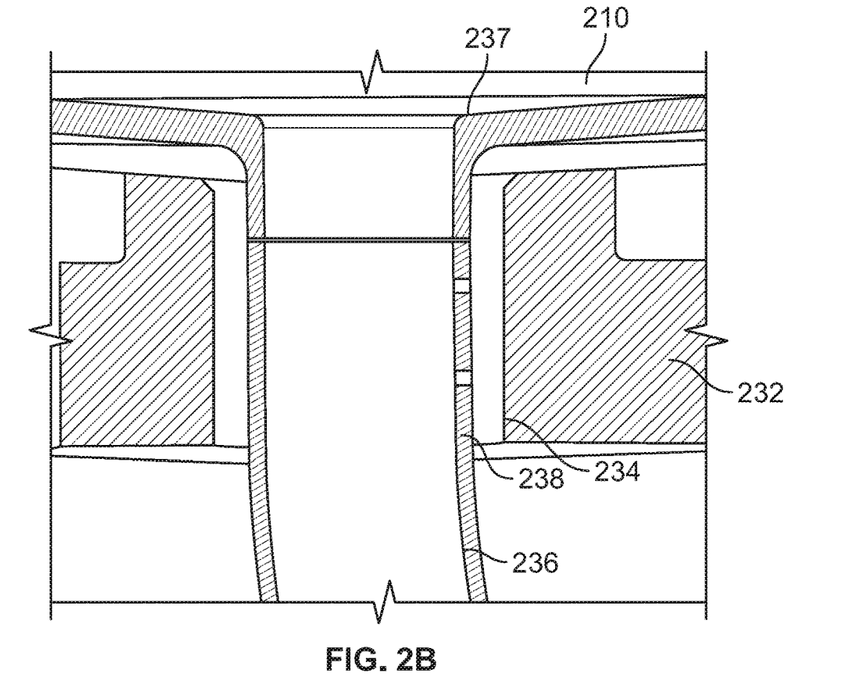
FIG. 2B is an enlarged view of the portion of FIG. 2A marked 2B-2B.

FIGS. 2A-2B show an example torch igniter 200 that can be used in the torch igniter system 108 of FIG. 1. In certain instances, the torch igniter system 108 includes multiple, spaced apart torch igniters 200. In this example, the torch igniter 200 includes an igniter body 202, an auxiliary fuel injector 204, and an ignition source 206. The igniter body 202 includes a main housing 208 outlining a hollow, substantially cylindrical interior cavity but could be different shape based on physical envelope requirement. The interior cavity of the main housing 208 receives an auxiliary combustion chamber 210. An annular gap between the outer surface of the auxiliary combustion chamber 210 and the inner surface of the housing 208 defines a fluid passage 212. The fuel injector 204 and ignition source 206 are supported by the housing 208. The ignition source 206, for example, is mounted directly to the housing 208, extending through an opening in the housing's side wall. A temperature sensor 213 (e.g., a thermocouple) is similarly mounted to the housing 208. The auxiliary fuel injector 204 is coupled to the housing 208 via a mounting bracket 214. That is, the mounting bracket 214 carries the fuel injector 204 and is directly attached (bolted, in this example) to the front end of the main housing 208.

In this example, the auxiliary fuel injector 204 includes a nozzle orifice 216, a fuel inlet line 218 and a fuel bypass line 220. The fuel inlet 218 is placed in fluid communication with a pressurized source of fuel (not shown). During use, pressurized fuel from the source flows toward the nozzle orifice 216 via the fuel inlet line 218. At least a portion of this fuel flow bypasses the nozzle orifice 216 and is returned to the main engine fuel manifold by the fuel bypass line 220. In some examples, the fuel injector incorporates additional design features for enhancing fuel atomization and increasing fuel turn down ratio to meet fuel flow requirement at all operating conditions without changing the size of the nozzle orifice 216, which may otherwise induce coking.

The auxiliary combustion chamber 210 received within the interior of the main housing 208 features a cylindrical body including a curved side wall 226 extending between substantially planar front and rear end walls 228,230. The cylindrical body of the auxiliary combustion chamber 210 defines an axial length "L" and a radial diameter "D". In some examples, the volume and/or the L/D ratio of the auxiliary combustion chamber 210 may affect flame stabilization. For example, flame stabilization can be improved by providing the auxiliary combustion chamber 210 with a volume and/or an L/D ratio that reduces the reference velocity of the fluid (i.e., the theoretical flow velocity of air through an area equal to the maximum cross section of the combustor casing). Improved flame stabilization may enable the torch igniter 200 to sustain the flame at higher pressure drop conditions, which increases the operating envelope of the primary combustor.

The igniter body 202 further includes an end cap provided in the form of a bulkhead 232 bolted to the rear end of the main housing 208. The bulkhead 232 generally closes off the interior cavity of the housing 208 with the exception of a central through-bore 234. As shown, the bore 234 of the bulkhead 232 receives an outlet tube 236 extending from a fluid outlet 237 at the rear end wall 230 of the auxiliary combustion chamber 210. The outlet tube 236 conveys heated fluid from the auxiliary combustion chamber 210 to the primary combustor. Notably, the inner diameter of the bulkhead's bore 234 is slightly larger than the outer diameter of the outlet tube 236, such that a narrow annular gap providing a fluid inlet 238 is formed therebetween (see FIG. 2B). The fluid inlet 238 is in fluid communication with the annular fluid passage 212 between the housing 208 and auxiliary combustion chamber 210. This configuration places the fluid inlet 238 and fluid outlet 237 of the igniter body 202 in a coaxial arrangement. Thus, a single opening in the outer shell (the main housing 208 and bulkhead 232) of the igniter body 202 is used to route fluid both to and from the auxiliary combustion chamber 210. The design of the bulkhead 232 is modular and application specific. This coaxial design effectively simplifies the manufacturing and assembly process, provides a compact form factor, and also facilitates crossflow between the two fluid flows. As explained in detail below in connection with FIG. 4, the cross flowing fluid enables incoming auxiliary air flow to be used for cooling and/or dilution purposes.

A premixing cup 240 resides within the interior of the auxiliary combustion chamber 210 proximate the chamber's planar front end wall 228. The premixing cup 240 includes an air inlet 242 and a cylindrical wall 244. The air inlet 242 radially surrounds the auxiliary fuel injector 204. The cylindrical wall 244 circumscribes the air inlet 242, and therefore also surrounds the fuel injector 204 radially. An air swirler 246 is positioned within the air inlet 242. In this example, the air swirler 246 has a disk-shaped body including a plurality of swirl openings arranged in a circumferential pattern. The swirl openings radially surround the outlet of the auxiliary fuel injector 204 and are oriented generally axially, at a canted, non-zero angle relative to the longitudinal axis of the auxiliary combustion chamber 210. Thus, the swirl openings are arranged to form a flow vortex along the longitudinal axis of the auxiliary combustion chamber 210. U.S. Patent Publication No. 2016/0047318, the entirety of which is incorporated herein by reference, describes an axial air swirler suitable for use in conjunction with embodiments of the present disclosure.

The cylindrical wall 244 of the premixing cup 240 protrudes axially outward relative to the front end wall 228 of the auxiliary combustion chamber 210 to extend through a frontal portion of the auxiliary combustion chamber's interior cavity. The cylindrical wall 244 delineates two discrete zones within the frontal portion in the auxiliary combustion chamber 210—a premixing zone 248 that is radially inward of the cylindrical wall and a recirculation zone 250 that is radially outward of the cylindrical wall. The premixing zone 248 provides a compact area for introducing the auxiliary flow of air to atomized fuel from the fuel injector 204, which enhances the degree of fuel/air mixing. When the mixed flow of air and fuel is expelled from the premixing cup 440 it immediately enters a downstream portion of the auxiliary combustion chamber 210. The empty space in the recirculation zone 250 draws a portion of the fuel/air mixture backwards in the auxiliary combustion chamber towards the chamber's front wall 228, creating a turbulent, toroidal flow pattern (see FIG. 3). This recirculating flow sustains combustion without having to maintain the ignition source 206 in an "on" condition, because a portion of the ignited air/fuel flow is recirculated back into the incoming fuel flow from the premixing zone 248. Even further, the turbulence and recirculation tends to mix the combusting air/fuel with uncombusted air/fuel, which more evenly ignites the air/fuel mixture throughout the auxiliary combustion chamber 210. This produces stronger, higher energy combustion.

Figure 3:
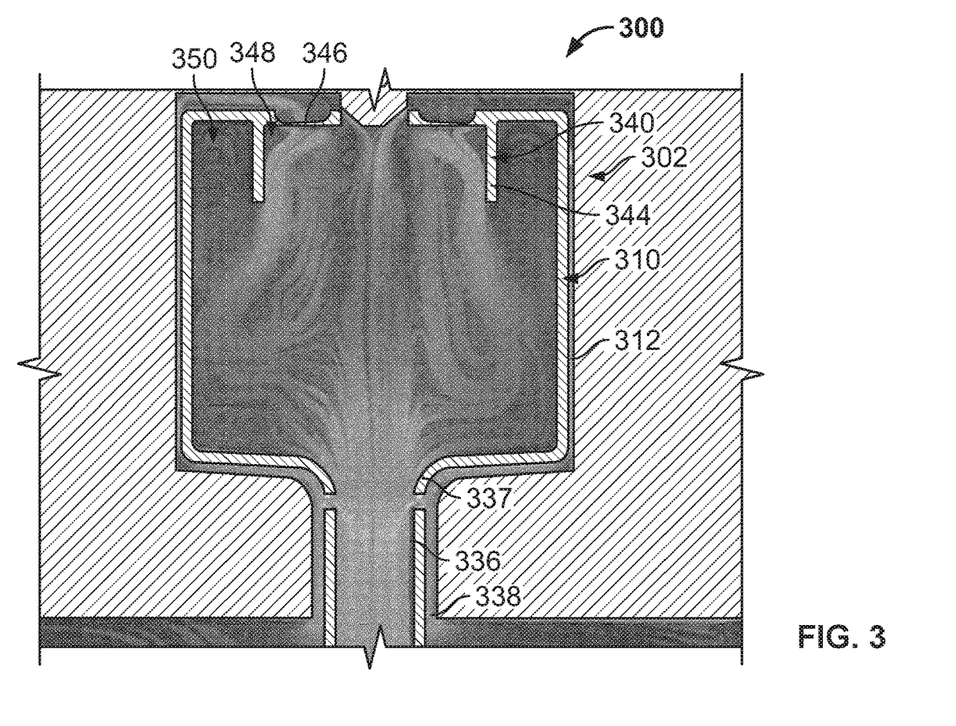
FIG. 3 is a diagram illustrating a velocity flow field achieved by operation of a second example torch igniter.

The diagram of FIG. 3 illustrates how fluid flows through a torch ignitor 300, which is similar in construction to the torch igniter 200 of FIGS. 2A and 2B. As shown in FIG. 3, an auxiliary flow of air enters an igniter body 302 of the torch igniter 300 via a fluid inlet 338. The auxiliary air flows from the fluid inlet 338 into an annular fluid passage 312. The fluid passage 312 directs the auxiliary airflow towards the air inlet of a premixing cup 340 where it is introduced to an axial air swirler 346. The auxiliary air traverses the air swirler 346 and flows into a mixing zone 348 defined by a cylindrical wall 344 of the premixing cup 340. In the mixing zone 348, the swirling auxiliary airflow meets and mixes with atomized fuel discharged from the auxiliary fuel injector 314. The fuel/air mixture flows from the mixing zone 348 into the remaining area of the auxiliary combustion chamber's interior cavity, including a recirculation zone 350 radially separated from the premixing zone 348 by the cylindrical wall 344. The fuel/air mixture is energized (e.g., ignited) by the ignition source, which is positioned in the auxiliary combustion chamber 310 proximate the recirculation zone 350. Heated fluid then flows through the auxiliary combustion chamber 310 towards the fluid outlet 337 and into the outlet tube 336, which leads to the primary combustion chamber.

Figure 4:
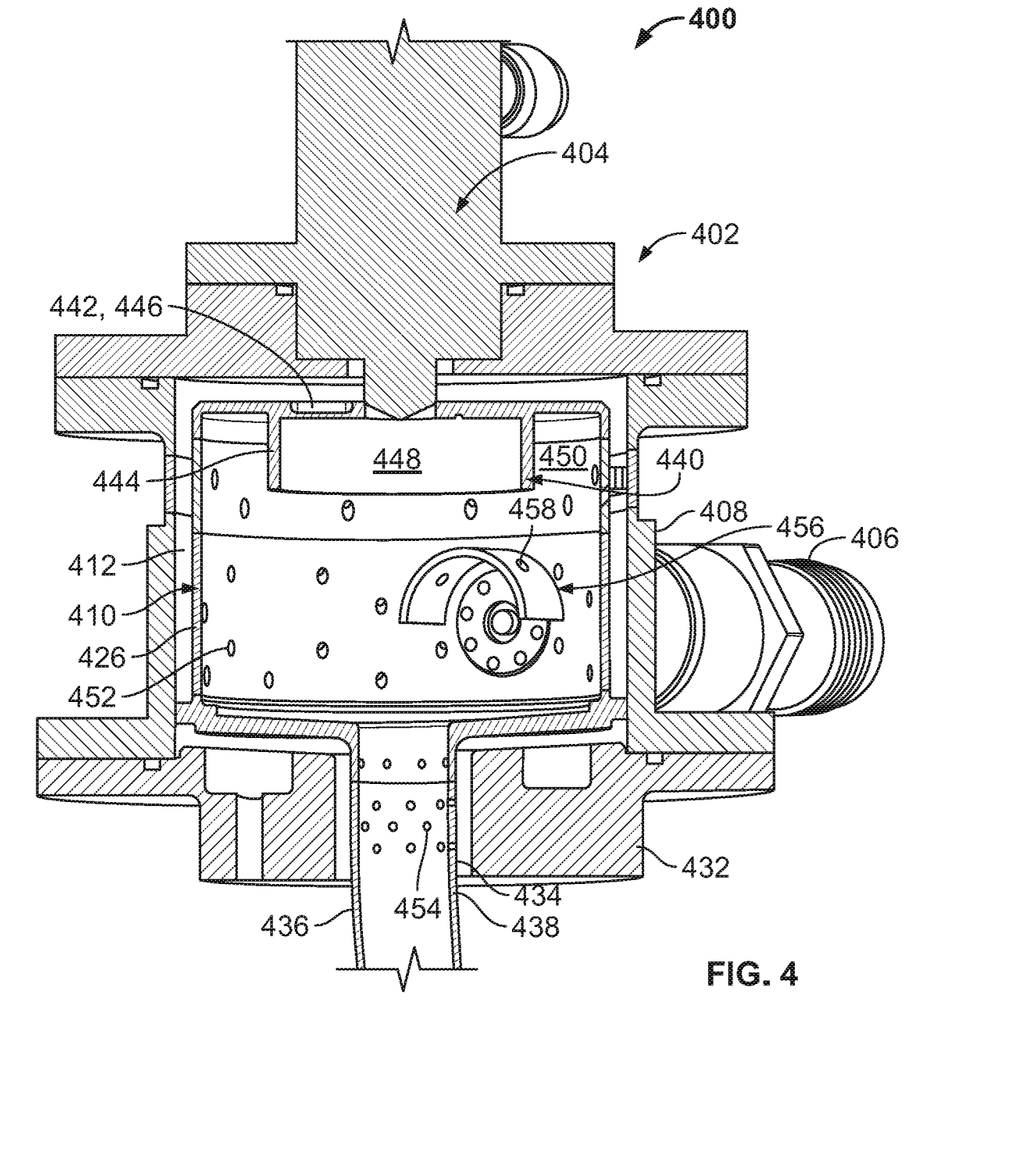
FIG. 4 is a half, side cross-sectional view of a third example torch igniter system.

FIG. 4 shows another example torch igniter 400. Like the previous examples, torch igniter 400 includes an igniter body 402, an auxiliary fuel injector 404, and an ignition source 406. The igniter body 402 includes a main housing 408 and a bulkhead 432 enclosing a hollow interior cavity containing an auxiliary combustion chamber 410. The bulkhead 432 includes a central bore 434 that receives an outlet tube 436 leading from the auxiliary combustion chamber 410. The respective annular gaps between the auxiliary combustion chamber 420 and the bulkhead 432 and main housing 408 define a fluid inlet 438 leading to a fluid passage 412. The interior of the auxiliary combustion chamber 410 includes a premixing cup 440 having an air inlet 442 receiving an air swirler 446. The premixing cup 440 further includes an axially protruding cylindrical wall 444 delineating a frontal portion of the auxiliary combustion chamber into a mixing zone 448 and a recirculation zone 450.

In this example, the auxiliary fuel injector 404 incorporates additional design features and control scheme for enhancing fuel atomization and increasing fuel turn down ratio to meet fuel flow requirement at all operating conditions without changing the size of the nozzle orifice, which may otherwise induce coking.

In this example, the curved side wall 426 of the auxiliary combustion chamber 410 includes a distributed pattern of cooling apertures 452. The cooling apertures 452 project through the side wall 426 of the auxiliary combustion chamber 410, enabling a portion of the auxiliary air flow traversing the annular fluid passage 412 to enter the auxiliary combustion chamber 410. In this example, each of the cooling apertures 452 is obliquely canted relative to the inner surface of the chamber's curved side wall 426. The angled orientation of the cooling apertures 452 causes air entering the auxiliary combustion chamber 410 therethrough to form a fluid film along the chamber's inner surface. The film of auxiliary air adheres to the inner surface of the auxiliary combustion chamber 410, and therefore is inhibited from comingling with the air/fuel mixture flowing from the premixing cup 440. This allows the auxiliary airflow to cool the auxiliary combustion chamber 410 without affecting the stoichiometry of the combustion process. The distribution of cooling apertures may vary between different implementations. For example, different implementations may employ more or less cooling apertures without departing from the scope of the present disclosure. Moreover, in some implementations, the distribution of cooling apertures may vary across the length of the auxiliary combustion chamber. For instance, in this example, the density of cooling apertures increases from the front end of the auxiliary combustion chamber 410 towards the rear end.

In addition to the cooling apertures 452, torch igniter 400 further includes a plurality of dilution apertures 454. In this example, the dilution apertures 454 are located along the outlet tube 436 that conveys heated fluid from the auxiliary combustion chamber 410 to the primary combustor. The dilution apertures 454 are configured to divert a portion of the auxiliary air flow from the annular fluid inlet 438. Unlike the cooling apertures 452, the dilution apertures 454 are designed to direct the incoming air into the flowpath of heated fluid exiting the auxiliary combustion chamber through the outlet tube 436. For example, the dilution apertures 454 may be substantially perpendicular to the curved surface of the outlet tube 436, as opposed to obliquely canted. The auxiliary air flow mixes with the heated fluid and dilutes the composition, which results in a relatively swift drop in temperature.

While the embodiment of FIG. 4 provides cooling apertures along the auxiliary combustion chamber and dilution apertures along the outlet tube, various other configurations are also contemplated within the scope of the present disclosure. Indeed, either or both of the auxiliary combustion chamber and outlet tube may include cooling and/or dilution apertures in different implementations.

The torch igniter 400 still further includes a shielding device 456 residing within the interior cavity of the auxiliary combustion chamber 410. The shielding device 456 is designed to at least partially shield the ignition source 406 from direct contact with the air/fuel mixture flowing from the premixing cup 440. In this example, the shielding device 456 includes curved body having a convex outer surface facing the premixing cup 440. As shown, the shielding device 456 further includes multiple apertures 458 distributed along the body that permit a limited portion of the fuel/air mixture to flow passed the tip of the ignition source 406. In some implementations, shielding the ignition source 406 in this way inhibits quenching that tends to occur at relatively cold fuel and air conditions and/or high pressure drop conditions.

A number of embodiments of the invention have been described. Nevertheless, it will be understood that various modifications may be made without departing from the spirit and scope of the inventions.

What is claimed is:

1. A gas turbine combustor assembly, comprising:
   a primary combustion chamber in fluid communication with a primary fuel injector and a primary air inlet; and
   a torch ignitor coupled to the primary combustion chamber, the torch igniter comprising:
      an auxiliary fuel injector;
      an ignition source; and
      an igniter body carrying the auxiliary fuel injector and the ignition source, the igniter body comprising:

an auxiliary combustion chamber having a side wall extending axially from a first end wall to a second end wall, the side wall defining an interior cavity between the first and second end walls; and a premixing cup residing within the interior cavity comprising a cylindrical wall radially surrounding the auxiliary fuel injector and an auxiliary air inlet, the cylindrical wall of the premixing cup protruding axially outward relative to the first end wall of the auxiliary combustion chamber through a portion of the interior cavity to delineate a premixing zone radially inward of the cylindrical wall and a recirculation zone radially outward of the cylindrical wall, wherein the recirculation zone is a space defined by the first end wall of the auxiliary combustion chamber, the side wall of the auxiliary combustion chamber, and the cylindrical wall of the premixing cup, the space of the recirculation zone configured to draw fuel/air mixture expelled downstream from the premixing cup back upstream toward the first end wall, and wherein the ignition source resides on the side wall of the auxiliary combustion chamber and at least a portion of the ignition source protrudes radially into the space of the recirculation zone.

2. The combustor assembly of claim 1, wherein the torch igniter further comprises:

an auxiliary fuel source in fluid communication with a nozzle orifice of the auxiliary fuel injector, the auxiliary fuel source configured to provide a pressurized flow of fuel for injection into the auxiliary combustion chamber by the auxiliary fuel injector; and a bypass line configured to return at least a portion of the pressurized flow of fuel to a main engine fuel manifold.

3. The combustor assembly of claim 1, wherein the auxiliary combustion chamber is substantially cylindrical in shape, with the side wall having a circular cross-section of constant diameter, and the first and second end walls being substantially planar.

4. The combustor assembly of claim 1, wherein the second end wall defines a fluid outlet leading to an outlet tube in fluid communication with the primary combustion chamber; and wherein the igniter body further comprises an outer shell surrounding at least a portion of the auxiliary combustion chamber, the outer shell comprising a fluid inlet coaxially aligned with the outlet tube.

5. The combustor assembly of claim 4, wherein the igniter body comprises a fluid annulus formed between an inner surface of the shell and an outer surface of the auxiliary combustion chamber, the annulus directing fluid from the fluid inlet across the outer surface of the auxiliary combustion chamber towards the first end wall.

6. The combustor assembly of claim 1, wherein the second end wall of the auxiliary combustion chamber defines a fluid outlet leading to an outlet tube in fluid communication with the primary combustion chamber, at least a portion of the outlet tube comprising a distributed pattern of dilution apertures, with each of the dilution apertures configured to direct fluid in cross-flow with heated gas exiting the auxiliary combustion chamber through the outlet tube.

7. The combustor assembly of claim 1, wherein the igniter body further comprises a fluid swirler residing at an entrance to the premixing cup.

8. The combustor assembly of claim 7, wherein the fluid swirler comprises an axial fluid swirler comprising a circumferential pattern of swirl opening surrounding an outlet of the auxiliary fuel injector.

9. The combustor assembly of claim 1, wherein the torch igniter further comprises a shielding device configured to at least partially shield the ignition source from fluid flow through the auxiliary combustion chamber.

10. The combustor assembly of claim 9, wherein the shielding device is coupled to an inner surface of the auxiliary combustion chamber proximate the ignition source, and comprises a curved, convex surface projecting towards the premixing cup.

11. The combustor assembly of claim 1, wherein at least a portion of the side wall of the auxiliary combustion chamber comprises a distributed pattern of cooling apertures, with each of the cooling apertures obliquely canted relative to an inner surface of the side wall so as to cause fluid entering an interior cavity of the auxiliary combustion chamber through the cooling apertures to form a fluid film along the inner surface.

12. A method of operating a gas turbine combustor assembly, the method comprising:

receiving auxiliary flows of fuel and air in a premixing cup of an igniter body of the gas turbine combustor assembly;

at least partially mixing the auxiliary fuel and air flows in a premixing zone of the premixing cup, and discharging the auxiliary fuel/air mixture downstream into an auxiliary combustion chamber of the igniter body;

drawing at least a portion of the discharged auxiliary fuel/air mixture back upstream toward a front end wall of the auxiliary combustion chamber into a recirculation zone between the premixing cup and a side wall of the auxiliary combustion chamber, wherein the recirculation zone is an annular space defined by the front wall of the auxiliary combustion chamber, the side wall of the auxiliary combustion chamber, and a cylindrical wall of the premixing cup;

igniting at least a portion of the auxiliary fuel/air mixture within the recirculation zone to form an auxiliary flow of heated fluid; and igniting a primary air/fuel mixture in a primary combustion chamber of the gas turbine combustor assembly with the auxiliary flow of heated fluid from the auxiliary combustion chamber of the igniter body.

13. The method of claim 12, wherein receiving the auxiliary flow of fuel comprises directing a pressurized flow of fuel from an auxiliary fuel source to a nozzle orifice of an auxiliary fuel injector in fluid communication with the premixing cup, bypassing the nozzle orifice with at least a portion of the pressurized flow of fuel, and directing the bypassed portion of the pressurized flow of fuel to a main engine fuel manifold.

14. The method of claim 12, wherein receiving the auxiliary flow of air comprises directing the auxiliary flow of air through a fluid inlet, and wherein the method further comprises:

directing the auxiliary flow of heated fluid through a fluid outlet tube coaxially aligned with the fluid inlet as the auxiliary flow of air is directed through the fluid inlet.

15. The method of claim 14, further comprising:

diluting the auxiliary flow of heated fluid by directing a portion of the auxiliary flow of air in cross-flow with the auxiliary flow of heated fluid through a pattern of dilution apertures of the outlet tube.

16. The method of claim 12, further comprising:
cooling a portion of the auxiliary combustion chamber by forming a cooling fluid film along an inner surface of the auxiliary combustion chamber.

17. The method of claim 16, wherein forming the cooling fluid film comprises directing a portion of the auxiliary flow of air through a distributed pattern of obliquely canted cooling apertures of the auxiliary combustion chamber.

18. The method of claim 12, wherein at least partially mixing the auxiliary fuel and air flows comprises inducing a swirling flow pattern in each of the flows.

19. The method of claim 12, wherein igniting the auxiliary fuel/air mixture comprises energizing an ignition source while at least partially shielding the ignition source from the auxiliary fuel/air mixture.

\* \* \* \* \*

UNITED STATES PATENT AND TRADEMARK OFFICE
CERTIFICATE OF CORRECTION

| | | |
|---|---|---|
| PATENT NO. | : 10,704,469 B2 | Page 1 of 1 |
| APPLICATION NO. | : 15/643736 | |
| DATED | : July 7, 2020 | |
| INVENTOR(S) | : Bidhan Dam et al. | |

It is certified that error appears in the above-identified patent and that said Letters Patent is hereby corrected as shown below:

On the Title Page

Column 1, (54) title, please delete "INGNITION" and insert -- IGNITION --

In the Specification

In Column 1, Line 1, please delete "INGNITION" and insert -- IGNITION --

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*